(12) United States Patent
Dellow

(10) Patent No.: US 8,200,985 B2
(45) Date of Patent: Jun. 12, 2012

(54) METHOD AND SYSTEM FOR PROTECTING DATA

(75) Inventor: Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 1263 days.

(21) Appl. No.: 11/858,530

(22) Filed: Sep. 20, 2007

(65) Prior Publication Data

US 2009/0080649 A1 Mar. 26, 2009

(51) Int. Cl.
*H04L 9/32* (2006.01)
(52) U.S. Cl. .......................... 713/189; 713/193
(58) Field of Classification Search .................. 713/189, 713/192–194; 380/277–279, 28, 44
See application file for complete search history.

(56) References Cited

U.S. PATENT DOCUMENTS

| 5,029,207 A * | 7/1991 | Gammie ....................... 380/228 |
| 2002/0073316 A1* | 6/2002 | Collins et al. ................. 713/174 |
| 2009/0049307 A1* | 2/2009 | Lin ............................... 713/185 |

* cited by examiner

*Primary Examiner* — Hosuk Song
(74) *Attorney, Agent, or Firm* — Sterne, Kessler, Goldstein & Fox PLLC

(57) ABSTRACT

Methods and systems for protecting data may include controlling encryption and/or decryption and identifying a destination of corresponding encrypted and/or decrypted data, utilizing rules based on a source location of the data prior to the encryption or decryption and an algorithm that may have been previously utilized for encrypting and/or decrypting the data prior to the data being stored in the source location. The source location and/or destination of the data may comprise protected or unprotected memory. One or more of a plurality of algorithms may be utilized for the encryption and/or decryption. The rules may be stored in a key table, which may be stored on-chip, and may be reprogrammable. One or more keys for the encryption and/or decryption may be generated within the chip.

33 Claims, 4 Drawing Sheets

METHOD AND SYSTEM FOR PROTECTING DATA

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to data security. More specifically, certain embodiments of the invention relate to a method and system for protecting data.

BACKGROUND OF THE INVENTION

A typical set-top box is a device that processes analog and/or digital information bearing media content. Set-top boxes (STB) may act as a gateway between a television or PC and a telephone, satellite, terrestrial or cable feed (incoming/outgoing signal.) The STB may receive encoded and/or compressed digital signals from the signal source such as satellite, TV station, cable network, a telephone company, for example, and decodes and/or decompresses those signals, converting them into analog signals displayable on a television. The STB accepts commands from the user (often via use of handheld remote control, keypad, voice recognition unit or keyboard) and transmits these commands back to the network operator.

The implementation of fee-based video broadcasting requires a conventional conditional access (CA) system to prevent non-subscribers and unauthorized users from receiving signal broadcasts. Cryptography algorithms may be utilized, for example, in content protection in digital set-top box systems and in other systems utilized in fee-based video broadcasting. Security keys may, therefore, play a significant part in the encryption and/or decryption process initiated by a cryptography algorithm. For each cryptography algorithm used in a fee-based video broadcasting system, there may be a set of associated security keys that may be needed by the algorithm.

In an increasingly security conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access. An example of a multimedia system that may be accessed by many different users may be a set-top box where manufacturers, vendors, operators, and/or home users may have an interest in accessing or restricting at least some limited functionality of the system.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for protection of data, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for protecting data. Exemplary aspects of the invention may comprise controlling encryption and/or decryption and identifying a destination of corresponding encrypted and/or decrypted data utilizing rules based on a source location of the data prior to the encryption or decryption and an algorithm that may have been previously utilized for encrypting and/or decrypting the data prior to the data being stored in the source location. The source location and/or destination of the data may comprise protected or unprotected memory. One or more of a plurality of algorithms may be utilized for the encryption and/or decryption. The rules may be stored in a key table, which may be stored on-chip, and may be reprogrammable. one or more keys for the encryption and/or decryption may be generated within the chip.

Figure 1A:
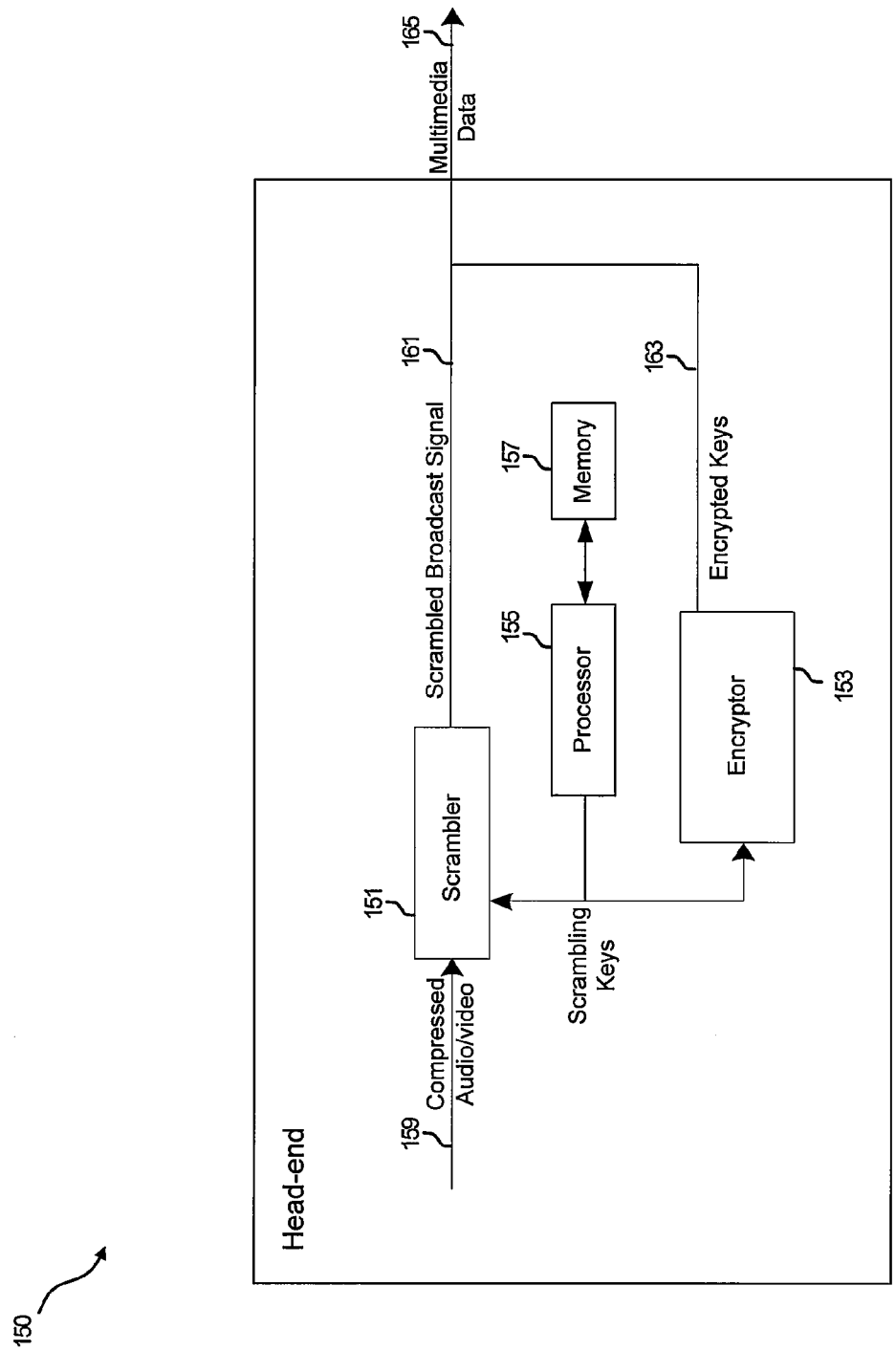
FIG. 1A is a block diagram illustrating an exemplary head-end system, in accordance with an embodiment of the invention.

FIG. 1A is a block diagram illustrating an exemplary head-end system, in accordance with an embodiment of the invention. Referring to FIG. 1A, there is shown a block diagram of an exemplary head-end 150 comprising a scrambler 151, an encryptor 153, a processor 155 and a memory 157. There is also shown compressed audio/video 159, a scrambled broadcast signal 161, encrypted keys 163 and a scrambled multimedia signal 165.

The memory 157 may comprise suitable circuitry, logic and/or code that may be enabled to store data that may be utilized by the processor 155 to control the scrambler 151 and the encryptor 153. The data stored on the memory 157 may be utilized by the processor 155 to generate scrambling keys for the scrambler 151 and the encryptor 153.

The scrambler 151 may comprise suitable circuitry, logic and/or code that may be enabled to scramble compressed audio/video 159 utilizing scrambling keys generated by the processor 155 to generate the scrambled broadcast signal 161.

The scrambling keys may be unique to a specific end user, or set-top box, and may be changed periodically to increase security.

The encryptor 153 may comprise suitable circuitry, logic and/or code that may be enabled to encrypt the scrambling keys to generate the encrypted keys 163. The encrypted keys 163 and the scrambled broadcast signal 161 may comprise the multimedia data 165 communicated to an end user, or set-top box.

The processor 155 may comprise suitable circuitry, logic and/or code that may be enabled to generate scrambling keys that may be utilized by the scrambler 151 and the encryptor 153 to generate a scrambled multimedia signal 165.

In operation, during signal scrambling in the head-end 150, the scrambling keys may determine the scrambling pattern and may be communicated to the scrambler 151 and the encryptor 153 by the processor 155. The scrambler 151 may copy protect scramble or conditional access scramble the compressed audio/video 159. The compressed audio/video 159 may be scrambled utilizing encryption standards such as data encryption standard (DES), advanced encryption standard (AES), triple-data encryption standard (3-DES), electronic codebook (ECB), cipher-block chaining (CBC), counter (CTR), cryptomeria cipher (C2), Windows media digital rights management (WMDRM), Rivest Cipher 4 (RC4), message authentication code (MAC) and M6 ciphers (M6S and M6k), for example. The scrambled multimedia signal 165 may be communicated to set-top boxes, for example, for decryption and display. Service providers may desire to control the decryption, storage and/or re-encryption capabilities of the set-top boxes, as described further with respect to FIG. 1B.

Figure 1B:
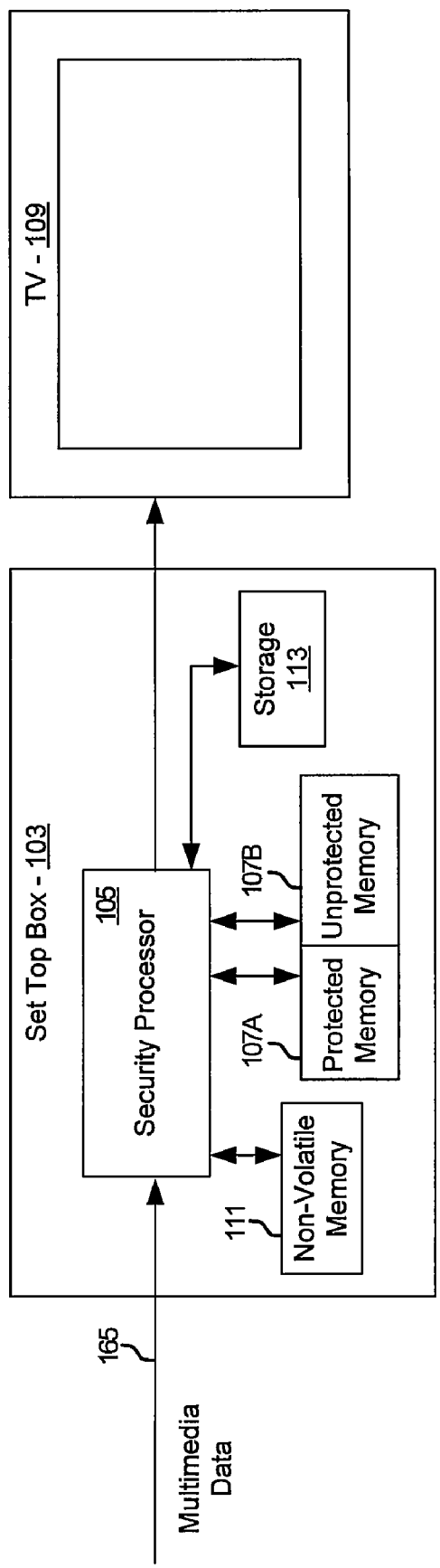
FIG. 1B is a block diagram illustrating an exemplary set-top box with a security processor, in accordance with an embodiment of the invention.

FIG. 1B is a block diagram illustrating an exemplary set-top box with a security processor, in accordance with an embodiment of the invention. Referring to FIG. 1B, there is shown a television 109 and a set-top box 103 comprising a security processor 105, a protected memory 107A, an unprotected memory 107B and a non-volatile memory (NVM) 111.

The scrambled multimedia signal 165 may be generated by a headend, service provider, satellite link, or IP network, for example, and may comprise audio, video, data and/or voice, as described with respect to FIG. 1A.

The set-top box 103 may comprise suitable circuitry, logic and/or code for receiving multimedia input signals and generating an output signal that may be displayed on the television 109 and/or stored in the protected and/or unprotected memory 107A and 107B.

The protected memory 107A may comprise suitable circuitry, logic and/or code that may be enabled to securely store decrypted data. The unprotected memory 107B may comprise suitable circuitry, logic and/or code that may be enabled to store encrypted data. The memory 107A and 107B may comprise dynamic random access memory (DRAM), for example.

The NVM 111 may comprise suitable circuitry, logic and/or code that may be enabled to store code for controlling operation of the set-top box 103. The code stored in NVM 111 may be loaded by the security processor 105 and written to the protected and/or unprotected memory 107A and 107B for execution by the security processor 105. In an embodiment of the invention, the NVM 111 may comprise a one-time programmable (OTP) memory.

The storage 113 may comprise suitable circuitry, logic and/or code that may be enabled to store data stored in unsecured storage. This data may comprise re-encrypted data that may have been decrypted by the security processor 105.

The security processor 105 may comprise suitable circuitry, logic and/or code that may be enabled to receive a scrambled transport stream and descrambling the transport stream for decoding and/or display. The security processor 105 may comprise a plurality of hardware encryption/decryption engines that may be enabled to decrypt incoming data and/or encrypt data to be communicated outside of the set top box 103.

The set-top box 103 may comprise various exemplary functions such as a scrambling/descrambling function, an entitlement control function, and an entitlement management function. The scrambling/descrambling function may be designed to make the program incomprehensible to unauthorized receivers. Scrambling may be applied commonly or separately to the different elementary stream components of a program. For example, the video, audio and data stream components of a TV program may be scrambled in order to make these streams unintelligible. Scrambling may be achieved by applying various scrambling algorithms to the stream components. The scrambling algorithm usually utilizes a descrambling key. Once the signal is received, the descrambling may be achieved by any receiver that holds the descrambling key used by the scrambling algorithm prior to transmission. Scrambling and descrambling operations, in general, may not cause any impairment in the quality of the signals. The descrambling key used by the scrambling algorithm is a secret parameter known only by the scrambler and the authorized descrambler or descramblers. In order to preserve the integrity of the encryption process, the control word may be changed frequently in order to avoid any exhaustive searches by an unauthorized user, which may be intended to discover the descrambling key.

The set-top box 103 may be enabled to scramble and/or randomize transmitted data bits so that unauthorized decoders may not decode the transmitted data bits. In addition to scrambling, a key may also be transformed into an encrypted key in order to protect it from any unauthorized users. In various embodiments of the invention, the CA system descrambling/scrambling system 100 may be enabled to utilize key encryption, and the encrypted keys may be securely distributed.

The set-top box 103 may be enabled to provide protection against signal piracy, efficient scrambling, flexibility, support for a variety of formats, and ease of implementation.

For CA or CP, private (secure) keys may be used for scrambling and descrambling high-value content or for protecting highly sensitive transactions. In a CA system, the content scrambling key may be protected. To ensure proper functionality, the CA system may perform scrambling according to the properties of the data for transmission. In addition, the CA system may be enabled to change the key regularly to maintain the security of the scrambling system, and transmit the key information to the receiver in a secure manner using, for example, a hierarchical encryption system.

In operation, multimedia data 165 may be received by the set-top box 103. As the security processor 105 may comprise a plurality of encryption/decryption algorithms, the set-top box 103 may receive multimedia data 165 that may be encrypted via one of a plurality of encryption standards, as described with respect to 1A. Due to the plurality of encryption/decryption standards and output destinations that may be utilized by the set-top box 103, the security processor 105 may be enabled to control the encryption/decryption algorithms to be utilized based on the source and the destination of the data. For example, if the incoming data may be from internet protocol television (IPTV), it may be decrypted utilizing an AES-CBC mode and stored in the protected memory 107A to be decoded and displayed, for example.

In instances where the data may be further processed or distributed, the data may be re-encrypted using an alternative algorithm and moved to the unprotected memory 107B. In a conventional system that allows both reading decrypted data and re-encryption, it may be possible to utilize a weak algorithm or a known key, thus revealing the data to a hacker.

In an embodiment of the invention, the source and destination of incoming data may be utilized to determine the cryptographic operation to be performed on the data. In this manner, decrypted data may be stored in a protected memory space according to system rules. Similarly, an encryption operation with a specific algorithm and key source may read from protected memory space, the protected memory 107A, for example, and store the encrypted result to another memory space, the unprotected memory 107B, for example. Table 1 below shows an exemplary memory to memory access requirement for IPTV. The 'e' and 'd' following each operation signifies encryption and decryption, respectively, where AES-128 CTR, for 128 bit counter advanced encryption standard, shows neither as it may be symmetric, or the same for encryption and decryption. The data shown in Table 1 may be stored in a non-volatile memory, such as the non-volatile memory 111. The memory access requirement data may be written during the manufacture or initial commissioning of the set-top box 103, and may be updated as the needs of the service provider may change.

In this exemplary embodiment, the incoming data may be AES-CBC encrypted. Thus, according to the access requirements shown in Table 1, following decryption, the data may not be stored in the unprotected memory 107B, since that would enable the prohibited situation of the same algorithm for decrypting incoming data and storing in the unprotected memory 107B. Decrypted data that may be stored in the protected memory 107A may then be decoded and displayed by the security processor 105 and the television 109, for example.

comprise both protected and unprotected regions, as described with respect to FIG. 1B. The DRAM 201 may also store data in one or more descriptors. The descriptor data may comprise key pointers that may be utilized to select a particular key in the key table 209 and the source, destination and algorithm of a memory to memory transfer and encryption/decryption process. In this regard, the descriptor may comprise the data source address and destination addresses. The descriptor data may also comprise mode information that may indicate whether the operation to be performed is an encryption or a decryption process.

The security system block 207 may comprise suitable circuitry, logic and/or code that may be enabled to control encryption and decryption processes of the security processor 105, and may control memory access of data to and from memory, such as the DRAM 201.

The key table 209 may comprise suitable circuitry, logic and/or code that may be enabled to store data to be utilized to verify source and destination rights associated with specific algorithms. The source and destination rights may be associated with specific parts of memory, such as protected and unprotected memory within the DRAM 201, or even whether data may be communicated outside the set-top box 103, as described with FIG. 1B. The data may also comprise specific keys, such as the key N, for example, that may be utilized by the E/D block 211 for encoding and/or decoding data. In another embodiment of the invention, the key may be received from the data to be encrypted and/or decrypted. In this embodiment of the invention, the security requirements may be reduced to allow for an external source of an encryption/decryption key. In instances where security requirements may be higher, the key may only be generated on-chip, such as in the key table 209 in the chip 203.

In another embodiment of the invention, the key table 209 may be stored in an OTP memory. In this manner, if the key table 209 may require updating, a new key table may be burned into an OTP, such as the NVM 111, described with respect to FIG. 1B.

TABLE 1

| Operation | Read from unprotected | Read from protected | Write to unprotected | Write to protected | Ext keys? |
|---|---|---|---|---|---|
| DES e | YES | NO | YES | YES | NO |
| DES d | YES | NO | YES | YES | NO |
| 3DES-ABA e | YES | NO | YES | YES | NO |
| 3DES-ABA d | YES | NO | YES | YES | NO |
| 3DES-ABC e | YES | NO | YES | YES | NO |
| 3DES-ABC d | YES | NO | YES | YES | NO |
| AES-128 ECB e | YES | NO | YES | YES | NO |
| AES-128 ECB d | YES | NO | YES | YES | NO |
| AES-128 CTR | YES | NO | YES | YES | NO |
| AES-128 CBC e | YES | NO | YES | YES | NO |
| AES-128 CBC d | YES | NO | NO | YES | NO |
| AES-192 e | YES | NO | YES | YES | NO |
| AES-192 d | YES | NO | YES | YES | NO |

Figure 2:
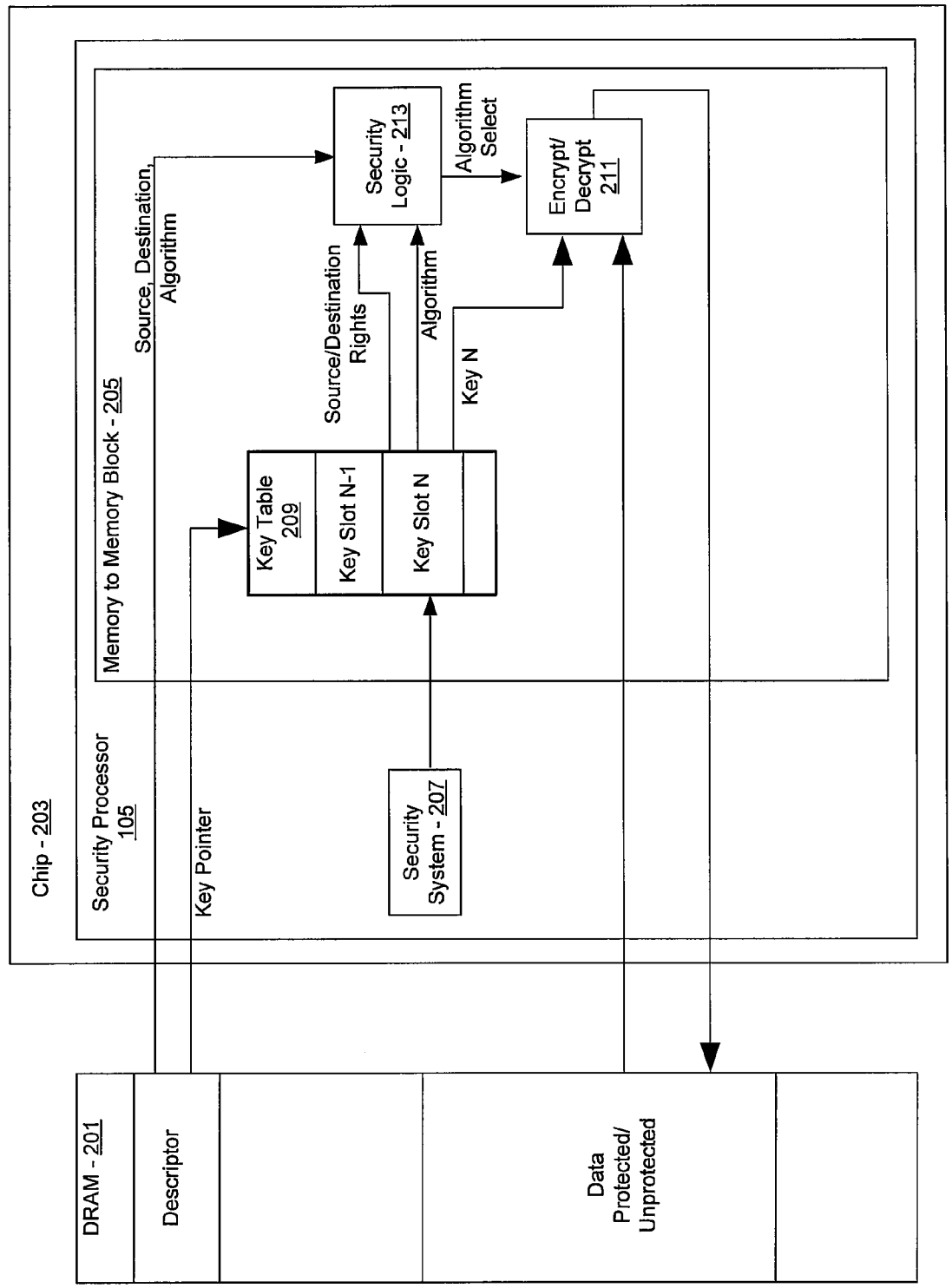
FIG. 2 is a block diagram illustrating an exemplary secure data storage implementation, in accordance with an embodiment of the invention.

FIG. 2 is a block diagram illustrating an exemplary secure data storage implementation, in accordance with an embodiment of the invention. Referring to FIG. 2, there is shown a DRAM 201 and a chip 203 which may comprise the security processor 105. The security processor 105 may comprise a memory to memory (M2M) block 205 and a security system block 207. The security processor 105 may be as described with respect to FIG. 1B. The M2M block 205 may comprise a key table 209, an encrypt/decrypt (E/D) block 211 and a security logic block 213.

The DRAM 201 may comprise suitable circuitry, logic and/or code that may be enabled to store data, and may The E/D block 211 may comprise suitable circuitry, logic and/or code that may be enabled to encrypt and/or decrypt data from the DRAM 201 according to the source and destination locations and algorithm specified by the key table 209 and verified by the security logic 213. The encrypted/decrypted data may be stored in the DRAM 201. Whether data is read from or stored to protected or unprotected regions of the DRAM 201 may be determined by the access requirements stored in the key table 209.

In operation, the security system block 207 may initiate a memory to memory encryption/decryption process by selecting a key slot, key slot N, for example, from the key table 209.

The appropriate key slot may be indicated by the key pointer, which may be extracted from the descriptor. The source and destination addresses and the algorithm to be utilized for encryption or decryption, may be communicated from the DRAM 201 to the security logic 213.

The source and destination rights and the appropriate algorithm stored in key slot N may be communicated to the security logic 213, and the key, Key N, for example for key slot N, may be communicated to the E/D block 211. If the algorithm for the source and destination extracted from the descriptor in DRAM 201 matches the algorithm defined by the source and destination rights as defined by the key slot N in the key table 209, the security logic 213 may communicate the appropriate algorithm to the E/D block 211. If the algorithm read from the descriptor does not match the algorithm/source/destination combination from the key slot N, the encryption/decryption may fail, indicating that the descriptor data in the DRAM 201 may be corrupted.

The E/D block 211 may read the data from the appropriate address in the DRAM 201, and execute the algorithm received from the security logic 213 utilizing the key read from the key slot N in the key table 209. In another embodiment of the invention, the key may be extracted from the data as received by the set-top box 103, described with respect to FIG. 1B. The security requirements may be lower in instances where encryption/decryption keys may be received from an external source. In instances where security requirements may be higher, such as when the data may be communicated outside of the set-top box 103, the encryption/decryption keys may only be generated by hardware from within the security processor 105. The encrypted/decrypted data may then be re-stored in the DRAM 201, either in protected or unprotected memory as defined by the source/destination rights from the key slot N in the key table 209.

Figure 3:
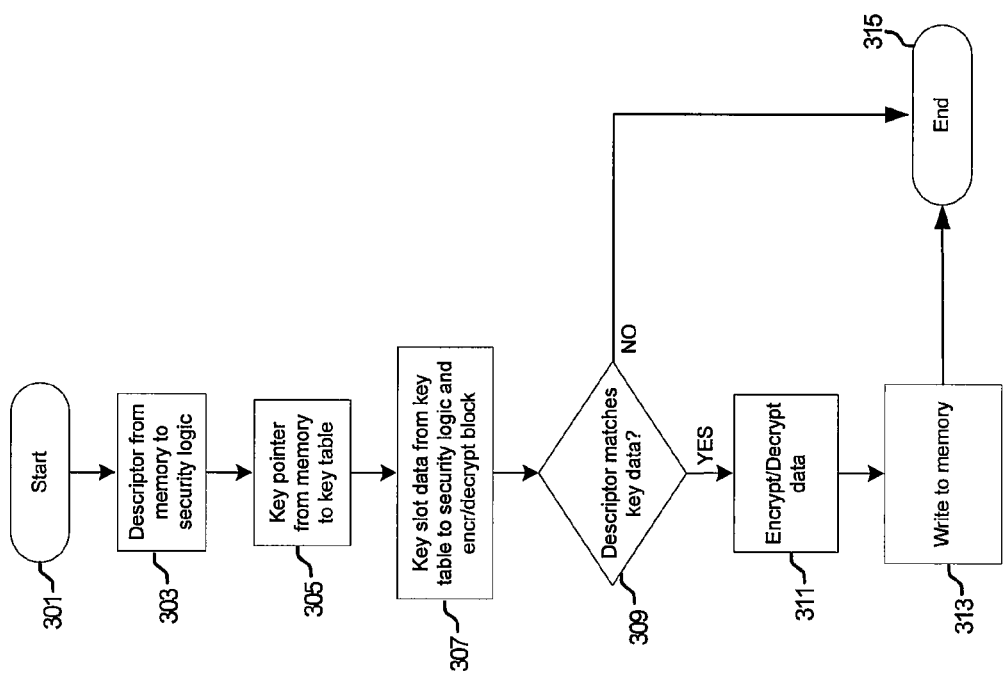
FIG. 3 is a flow diagram illustrating an exemplary memory to memory encryption/decryption process, in accordance with an embodiment of the invention.

FIG. 3 is a flow diagram illustrating an exemplary memory to memory encryption/decryption process, in accordance with an embodiment of the invention. Referring to FIG. 3, after start step 301 in step 303, the descriptor comprising the data source and destination addresses as well as the decryption/encryption algorithm may be read from the DRAM 201 to the security logic 213. In step 305, the key pointer from the descriptor stored in the DRAM 201 may be utilized to indicate which key slot, such as key slot N, from the key table 209 may be utilized by the security logic to confirm the rights of the algorithm/source/destination as read from the descriptor.

In step 307, the key slot data, such as from key slot N, for example, may be utilized to communicate the source/destination rights and the appropriate algorithm to the security logic 213, and the key ID to the E/D block 211. In step 309, the security logic 213 may compare the source address, the destination address and one or more of the algorithms from the descriptor may be compared to the source/destination rights and algorithm from the key table N. If they do not match, data may be corrupted or there may be an attempted hack, and the process may proceed to end step 315. If the descriptor data matches the rights and algorithm from the key table 209, the process may proceed to step 311 where the E/D block 211 may encrypt/decrypt the data from the DRAM 211, followed by step 313 where the resulting data may be re-written to the DRAM 201. The process may then proceed to end step 315.

In an embodiment of the invention, a method and system are provided for controlling encryption and/or decryption of data and identifying a destination of corresponding encrypted and/or decrypted data utilizing rules based on a source location of the data prior to the encryption or decryption and an algorithm that may have been previously utilized for encrypting and/or decrypting the data prior to the data being stored in the source location. The source location and/or destination of the data may comprise protected 107A or unprotected memory 107B. One or more of a plurality of algorithms may be utilized for the encryption and/or decryption. The rules may be stored in a key table 209, which may be stored on-chip 203, and may be reprogrammable. One or more keys for the encryption and/or decryption may be generated within the chip 203.

Certain embodiments of the invention may comprise a machine-readable storage having stored thereon, a computer program having at least one code section for protecting data, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for data communication, the method comprising:
   in a security processor on a chip, controlling encryption and/or decryption of data and identifying a destination of corresponding encrypted and/or decrypted data utilizing one or more rules based on:
      a source location of said data prior to said encryption and/or decryption; and
      an algorithm that was previously utilized for encrypting and/or decrypting said data prior to said data being stored in said source location.

2. The method according to claim 1, wherein said source location of said data comprises protected memory.

3. The method according to claim 1, wherein said source location of said data comprises unprotected memory.

4. The method according to claim 1, wherein said destination of said data comprises protected memory.

5. The method according to claim 1, wherein said destination of said data comprises unprotected memory.

6. The method according to claim 1, comprising utilizing one or more of a plurality of algorithms for each of said encryption and/or decryption.

7. The method according to claim 1, comprising storing said rules in a key table.

8. The method according to claim 7, comprising storing said key table on said chip.

9. The method according to claim 7, comprising storing said key table in one-time-programmable memory on said chip.

10. The method according to claim 7, wherein said key table is reprogrammable.

11. The method according to claim 1, comprising generating one or more keys for said encryption and/or decryption within said chip.

12. A system for data communication, the system comprising:
   one or more circuits within a security processor on a chip that enable controlling encryption and/or decryption of data and identifying a destination of corresponding encrypted and/or decrypted data utilizing one or more rules based on:
      a source location of said data prior to said encryption and/or decryption; and
      an algorithm that was previously utilized for encrypting and/or decrypting said data prior to said data being stored in said source location.

13. The system according to claim 12, wherein said source location of said data comprises protected memory.

14. The system according to claim 12, wherein said source location of said data comprises unprotected memory.

15. The system according to claim 12, wherein said destination of said data comprises protected memory.

16. The system according to claim 12, wherein said destination of said data comprises unprotected memory.

17. The system according to claim 12, wherein said one or more circuits enable utilizing one or more of a plurality of algorithms for each of said encryption and/or decryption.

18. The system according to claim 12, wherein said one or more circuits enable storing said rules in a key table.

19. The system according to claim 18, wherein said one or more circuits enable storing said key table on said chip.

20. The system according to claim 18, comprising storing said key table in one-time-programmable memory on said chip.

21. The system according to claim 18, wherein said one or more circuits enable reprogramming said key table.

22. The system according to claim 12, wherein said one or more circuits enable generating one or more keys for said encryption and/or decryption within said chip.

23. A machine-readable storage having stored thereon, a computer program having at least one code section for data communication, the at least one code section being executable by a machine for causing the machine to perform steps comprising:
   in a security processor on a chip, controlling encryption and/or decryption of data and identifying a destination of corresponding encrypted and/or decrypted data utilizing one or more rules based on:
      a source location of said data prior to said encryption and/or decryption; and
      an algorithm that was previously utilized for encrypting and/or decrypting said data prior to said data being stored in said source location.

24. The machine readable storage according to claim 23, wherein said source location of said data comprises protected memory.

25. The machine readable storage according to claim 23, wherein said source location of said data comprises unprotected memory.

26. The machine readable storage according to claim 23, wherein said destination of said data comprises protected memory.

27. The machine readable storage according to claim 23, wherein said destination of said data comprises unprotected memory.

28. The machine readable storage according to claim 23, wherein said at least one code section comprises code for utilizing one or more of a plurality of algorithms for each of said encryption and/or decryption.

29. The machine readable storage according to claim 23, wherein said at least one code section comprises code for storing said rules in a key table.

30. The machine readable storage according to claim 29, wherein said at least one code section comprises code for storing said key table on said chip.

31. The machine readable storage according to claim 29, wherein said at least one code section comprises code for storing said key table in one-time-programmable memory on said chip.

32. The machine readable storage according to claim 29, wherein said at least one code section comprises code for reprogramming said key table.

33. The machine readable storage according to claim 23, wherein said at least one code section comprises code for generating one or more keys for said encryption and/or decryption within said chip.

* * * * *